Oct. 29, 1940.                O. JACOBUS                 2,219,419

SHOE SHANK PRESS

Filed Nov. 15, 1939

Inventor
OTTO JACOBUS

Patented Oct. 29, 1940

2,219,419

UNITED STATES PATENT OFFICE 2,219,419

SHOE SHANK PRESS

Otto Jacobus, Olean, N. Y.

Application November 15, 1939, Serial No. 304,611

1 Claim. (Cl. 12—33)

This invention relates to shank presses for shoes and has for its object to provide an improved and convenient device for applying pressure to the shank of a shoe in assembling or repairing the same, particularly in those operations which do not require cementing the entire sole. Some shoes require only the shank to be pressed, the remainder of the sole being sewed on or otherwise attached. The present invention is designed to perform the operation referred to in a simple and economical manner, and it embodies a shank block which is mounted on the base of the frame of the press and fits within the shoe, and a press plate, which may be electrically heated, and is provided with a rubber pad or facing for contact with the shank of the shoe. The plate is pressed to contact by a hand screw or the like, and is mounted to swing so that it can be readily positioned or adjusted according to the work.

The invention will be understood from the following description and the accompanying drawing which illustrates one form thereof and in which.

Figure 1:
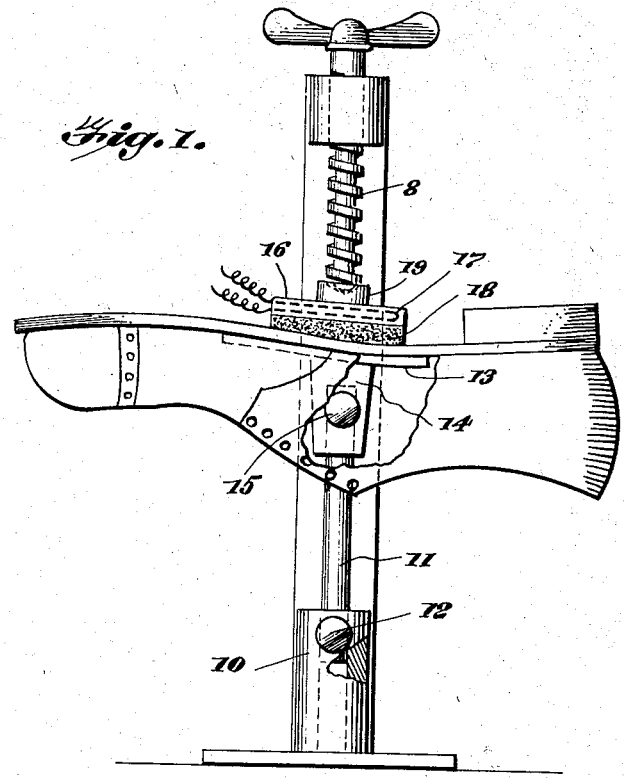
Fig. 1 is a front elevation of the press.
Figure 2:
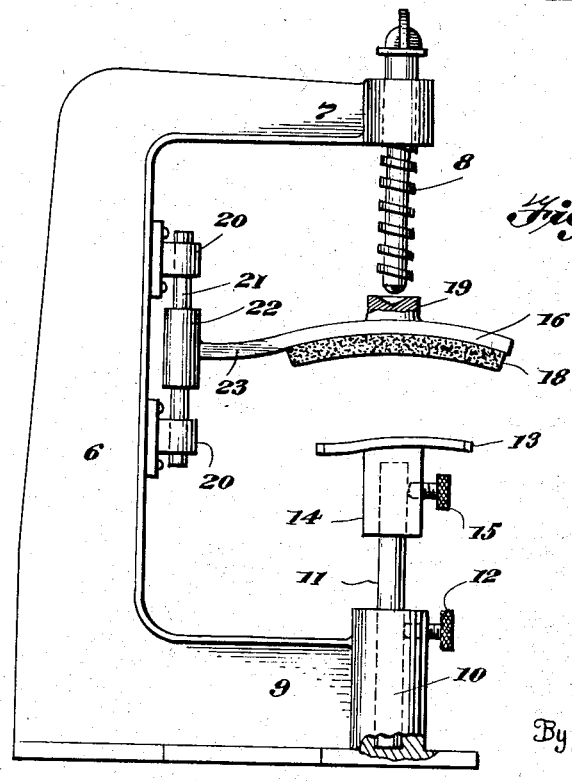
Fig. 2 is a side elevation thereof.

The press frame may be of any suitable or ordinary construction and in the form shown comprises a U-shaped frame 6 having an upper arm 7 tapped to receive the hand screw 8 by which the pressure is applied. The base 9 of the frame has a socket 10 within which fits the lower end of a metal rod 11 which may be held at adjustment by a set screw 12 tapped through the socket and engaging the rod.

The upper end of the rod 11 supports a shank block 13 which has on its under side a socket 14 in which the upper end of the rod fits and is held in place by a set screw 15. This construction permits the shank block to be removed and another substituted if desired, to suit shanks having different curvatures or angles. As shown in Fig. 1 this shank block fits inside the shoe and under the shank of the shoe to support the same. The outer shank plate is indicated at 16 and is properly shaped or curved to fit the outside of the shank and press the same upon the shank block in the cementing operation. The shank plate may be, and preferably is, heated by an electric heating element embedded therein and indicated at 17, which element may receive its current from any suitable electrical connections. The plate is preferably faced by a rubber pad 18 fixed thereto, and on the back has a boss 19 which receives the pressure of the end of the screw 8.

The plate 16 is pivotally mounted to swing into and out of position by means of a pair of brackets 20 secured to the upright arm of the frame and a pivot pin 21 supported in the brackets and on which is mounted a sleeve 22 connected to the sole plate 16 by an extension 23 of the plate. Obviously the pin 21 may be fixed in the brackets 20 with the sleeve 22 mounted loosely to turn or slide on the pin, or, the sleeve 22 may be fixed to the pin and the latter loosely mounted in the brackets to slide or swing therein. This support for the plate permits an up and down movement of the latter and also a swinging movement, so that it may be swung to proper position upon the shank of the shoe and then pressed down by operation of the screw. It is therefore capable of nice adjustment and convenient operation according to the work at hand.

It is believed that the operation will be evident from the drawing and the foregoing description and the whole forms a shank press well adapted for work of the kind described and is particularly useful in cementing a shank in place by means of heat and pressure without nailing operations.

I claim:

A shoe shank press comprising a C-frame the base of which has a vertical socket therein, a shank block provided with a depending rod fitting and vertically adjustable in the socket, a bracket having a vertical pin supported on the inner side of the frame, a shank plate having a pivotal mounting on said pin slidable up and down thereon, and a screw working through the upper arm of the frame and having a detachable bearing against the top of the shank plate.

OTTO JACOBUS.